United States Patent [19]

Hester

[11] Patent Number: 4,465,222

[45] Date of Patent: Aug. 14, 1984

[54] METHOD OF MAKING A DRILL STRING STABILIZER

[76] Inventor: John W. Hester, 1700 Savanne Rd., Houma, La. 70360

[21] Appl. No.: 433,637

[22] Filed: Oct. 12, 1982

[51] Int. Cl.³ ............................................. B23K 31/00
[52] U.S. Cl. .................................. 228/170; 76/108 A; 76/101 A
[58] Field of Search ............. 228/170, 182; 76/101 R, 76/101 SM, 101 A, 108 T, 108 A, 102; 29/412, 415; 408/83

[56] References Cited

U.S. PATENT DOCUMENTS 3,348,295 10/1967 Bass .................................... 76/101 R

FOREIGN PATENT DOCUMENTS 146049 7/1920 United Kingdom ............. 76/101 A

*Primary Examiner*—Nicholas P. Godici
*Assistant Examiner*—Marc Hodak

[57] ABSTRACT

This invention relates to a method of making a drill string stabilizer such as a drill collar stabilizer. It includes the steps of providing a length of drill string or drill collar as the body of the stabilizer. There is also provided a cylindrical section of a thick-walled tubing having an inside diameter matching the outside diameter of the stabilizer body. A plurality of helical and elongated sections from the cylindrical section of tubing are cut to form a plurality of spiral blades. These blades are attached as by welding to the body of said stabilizer in a circumferentially generally equally spaced row thereabout. The cylindrical section of tubing is selected to have a predetermined outside diameter such that the blades will have a predetermined radial thickness when attached to the body. In addition each of the blades may be provided with a tapered end surface so as to facilitate running of the tool in the well bore.

3 Claims, 5 Drawing Figures

METHOD OF MAKING A DRILL STRING STABILIZER

BRIEF SUMMARY OF THE INVENTION

This invention relates to a method of making a drill string stabilizer of the type conventionally used in drilling oil well or gas well bores, which stabilizers are for the purpose of maintaining or controlling the direction of the drilling operation. Generally, the drill string or drill collar stabilizer of the type to which this invention relates are included in the drill string and are comprised of a plurality of circumferentially spaced helical shaped blades which more uniformly space the drill string away from the well bore surface.

The method heretofore used in the industry in fabricating stabilizers of this type is to place a piece of bar stock at an angle on a piece of the drill collar stock which is to be the body of the stabilizer. The bar stock is then tack welded at one end to the drill collar body and thereafter the bar stock is heated and bent until it fits flush on the body. Thereafter the blade is then welded in place and put in a lathe and turned to the desired outside diameter size. This process takes several hours to complete including the setup operation, the tack welding operation, the heat operation, the bending operation and the final welding.

The problem with drill string stabilizers made in accordance with the aforesaid process is that the blades frequently break away from the body because of the improper or untrue fit and because the welds have a tendency to break because of the fatigue in the area where the blade did not fit or the weld was not made perfectly.

It is therefore an object of this invention to provide an improved method of manufacturing blade type drill string stabilizers. As stated, this invention is a method of making a drill string stabilizer including the steps of providing a length of drill string as the body of the stabilizer. There is also provided a cylindrical section of a tubing having an inside diameter matching the outside diameter of the stabilizer body. A plurality of helical and elongated sections are cut from the cylinder to form a plurality of spiral or helical shaped blades. These blades are then attached as by welding or the like to the body of the stabilizer in a circumferentially generally equally spaced row thereabout. It is to be understood that the cylindrical section of tubing selected for cutting the blades therefrom has a predetermined outside diameter such that said blades will have predetermined radial thickness when applied to the body which will not require any milling to reduce to the desired size. In certain instances, each of the blades may be provided with a tapered end surface which tapering may be provided either before the same are cut from the cylinder or thereafter.

DETAILED DESCRIPTION OF THE INVENTION

Figure 1:
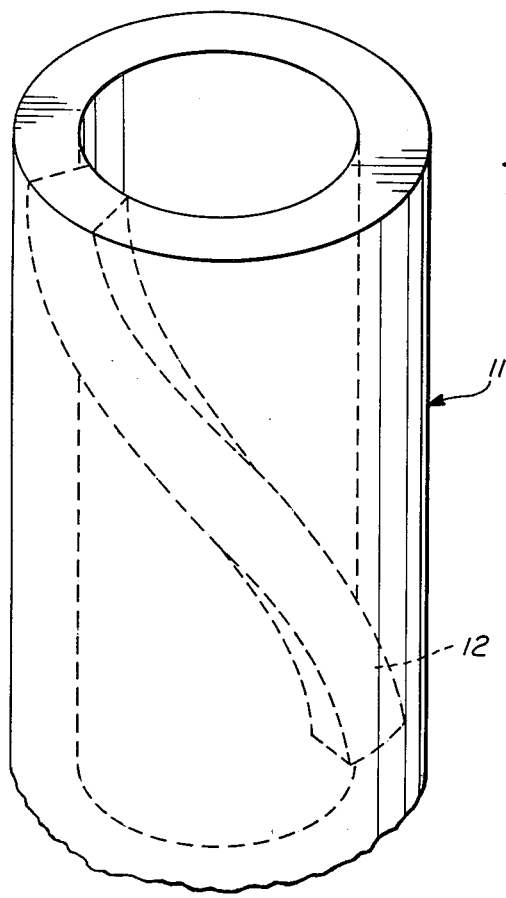
FIG. 1 is a perspective view of a cylindrical section of the tubing from which the blades are cut.
Figure 2:
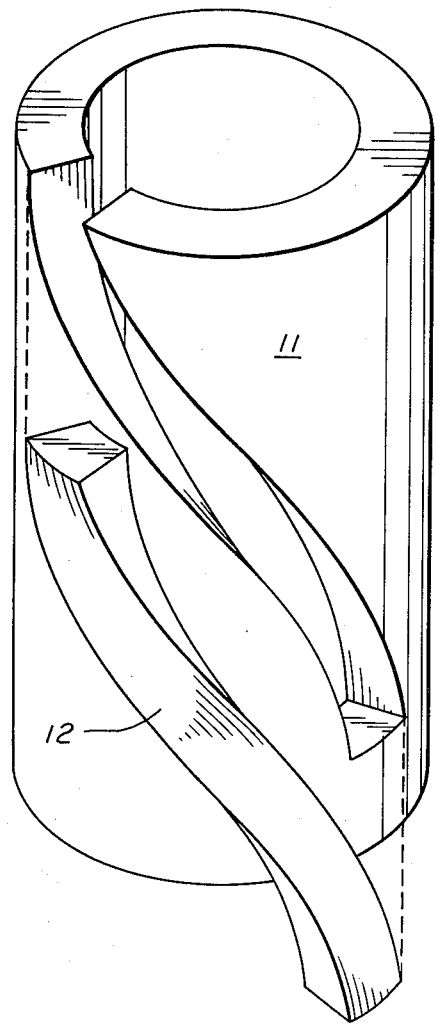
FIG. 2 is a view similar to FIG. 1 but shown having one blade section cut therefrom.
Figure 3:
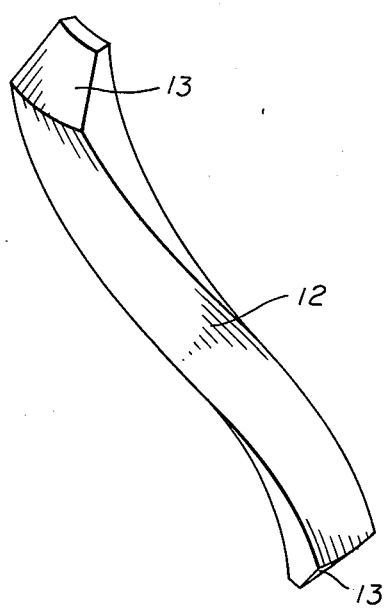
FIG. 3 is a perspective view of one of the helical blades after the ends have been tapered.

Referring now to FIG. 1, a selected cylindrical section 11 of a tubing showing in phantom form the helical type blade 12 which will be cut therefrom. It is to be understood that section 11 is selected to have an internal diameter matching the external diameter of the stabilizer body to be described hereinafter. In addition, section 11 is selected to have an outside diameter so as to provide the blades which are cut therefrom of the desired radial thickness. In addition, the length of section 11 is selected so as to provide blades of the desired axial lengths.

Thus selected and provided as described, the same is placed into a cutting machine and a plurality of generally spiral or helical blades 12 are cut therefrom. If desired the ends of blades 12 may be tapered as shown at 13 either by milling a V-shaped annular groove at each end of the blades before the same are cut from section 11 or milling the same after cutting therefrom.

Figure 4:
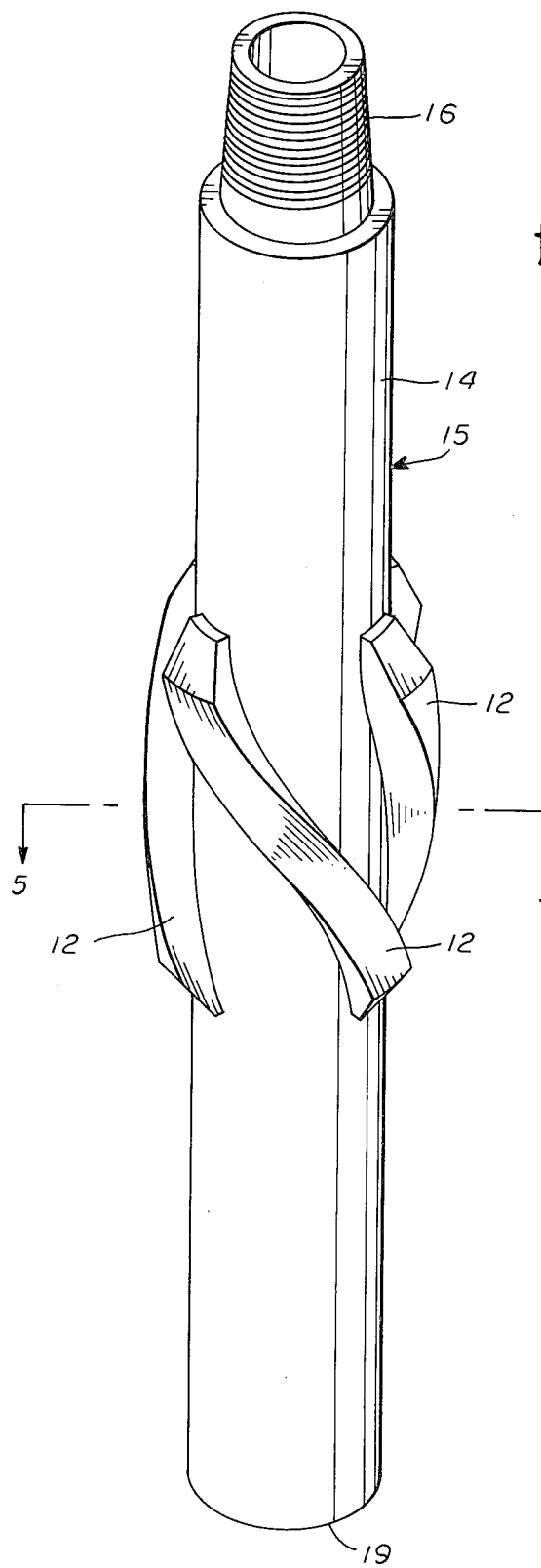
FIG. 4 is a perspective view of a drill string stabilizer resulting from the method of this invention.
Figure 5:
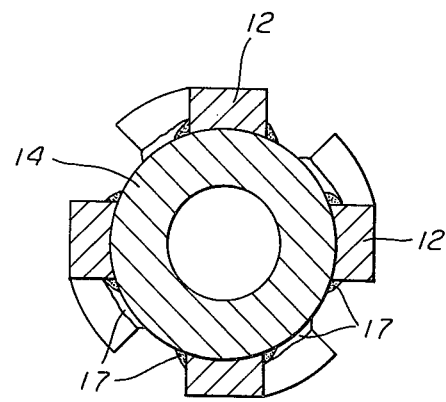
FIG. 5 is a cross-sectional view taken generally along line 5—5 of FIG. 4.

Referring now to FIGS. 4 and 5, there is provided a length of drill string designated by the numeral 14 which constitutes the body of the drilling stabilizer generally designated by the numeral 15. The upper end of drill string stabilizer 15 is provided with a threaded end 16 and the lower end is provided with the usual box end 19. The blades 12 are attached to body 14 as by welding as shown at 17 so as to provide a generally circumferentially and equally spaced row of blades 12 about body 14, which completes the assembly of the tool.

It will be noted that by correctly selecting the specified inside and outside diameters of cylindrical section 11, blades 12 are of the desired and correct radial thickness which thereby eliminates any milling operation to reduce the same to the correct size. This method also makes it possible to vary the degree of helix for blades 12, the thickness thereof, and the length thereof, all within the scope of this invention.

This method eliminates the heating, bending and machining heretofore required to produce tools of this type. There is an absolute perfect fit of the inside surfaces of the spiral blades 12 on the exterior surface of body 14 which thereby permits more secure welding and attachment therebetween. Thus fashioned there is thus provided a much more uniform and stronger tool which can be subjected to greater stresses without resultant failure.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. In a method of making a drill string stabilizer, the steps comprising:
    providing a length of drill string as the body of said stabilizer;
    providing a cylindrical section of a tubing having an inside diameter matching the outside diameter of said stabilizer body;
    cutting a plurality of helical and elongated sections from said cylindrical section of said tubing to form a plurality of helical blades;
    and attaching said blades as by welding to said body of said stabilizer in a circumferential generally equally spaced row thereabout.

2. The invention as claimed in claim 1 wherein:
    said cylindrical section of tubing is selected to have a predetermined outside diameter such that said blades will have a predetermined radial thickness when applied to said body.

3. The invention as claimed in claim 1 including:
    milling each end of each of said blades to provide a tapered surface at each end thereof.

* * * * *